Dec. 13, 1955 W. J. ZENNER 2,727,091

CENTRIFUGAL TAPE READER

Filed Aug. 29, 1952

INVENTOR
WALTER J. ZENNER
BY Emery Robinson
ATTORNEY 2,727,091

CENTRIFUGAL TAPE READER

Walter J. Zenner, Des Plaines, Ill., assignor to Teletype Corporation, Chicago, Ill., a corporation of Delaware Application August 29, 1952, Serial No. 307,052
10 Claims. (Cl. 178—17)

Figure 2:
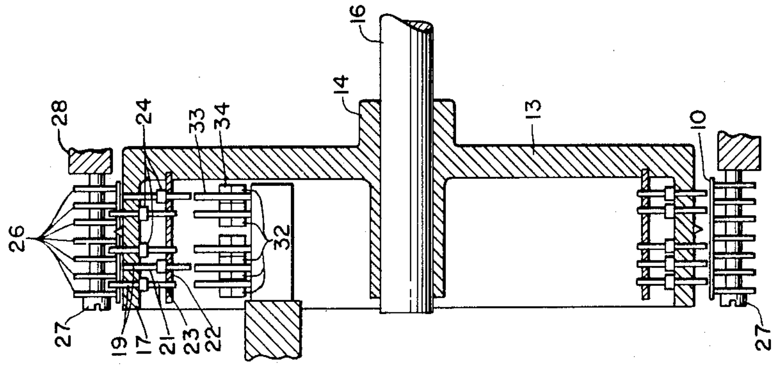

This invention relates to a centrifugal tape reader and more particularly to a tape reader capable of operating at ultra high speeds and utilizing centrifugally actuated sensing elements for ascertaining permutations of apertures formed in a telegraph message tape.

Heretofore mechanical tape readers, preform sensers, punch card analyzers, and the like have taken the general form of spring actuated devices or articulated linkage devices or a combination of these two. More specifically, the spring operated devices have consisted of spring contact members adapted to pass through the holes perforated in a record medium to complete electrical circuits to control operation of some form of associated mechanism. The articulated linkage devices have generally consisted of mechanisms for moving and withdrawing sensing elements from a message tape through the instrumentality of an oscillating bail or a plurality of rotating cams or eccentrics.

These prior art devices possess the inherent disadvantages in that the spring mechanisms are subjected to fatigue or breakage after a period of use. Further, the prior art tape readers employing articulated linkages are subjected to wear in overcoming friction in the articulated joints hence necessitating constant lubrication and ultimate replacement.

It is a primary object of the present invention to provide a tape or record reader operable at ultra high speeds without the necessity of employing springs or articulated mechanisms.

It is a further object of the present invention to provide a tape or preform reader wherein the elemental parts are relatively free from fatigue and frictional wear.

An additional object of the present invention resides in a tape reader utilizing centrifugal forces for moving the sensing elements into a sensing position.

A further and more specific object of the invention resides in the utilization of a magnetic pickup unit to ascertain the permutative setting of a plurality of sensing elements positioned in accordance with sets of permutative apertures contained in a telegraph message tape.

With these and other objects in view, the present invention contemplates a tape reader comprising a constantly rotating drum having a plurality of sets of tape sensing elements slidably mounted in the periphery of the drum. An arcuate guide unit is mounted in close proximity to the periphery of the drum in such a fashion that one extremity of the guide unit is spaced further from the periphery of the drum than the other extremity. Standard telegraph message tape is fed into the relatively widely spaced gap formed between the periphery of the drum and the extremity of the arcuate guide unit. Feed pins uniformly spaced along the periphery of the drum engage guide holes formed within the telegraph message tape to feed the tape through the space formed between the guide unit and the periphery of the drum. The tape is gradually forced into engagement with the periphery of the drum by the action of the arcuate guide unit pressing against the tape as the gap between the guide unit and the periphery of the drum decreases as the tape is progressively advanced.

The sensing elements are eventually permutatively positioned in accordance with the permutations of apertures in the telegraph tape and when fully positioned are sensed by means of a magnetic sensing device. The magnetic sensing device is connected to any one of a number of well known standard telegraph transmitters for the purpose of transmitting telegraph signals representative of the permutations of apertures in the message tape to a distant receiving station.

Figure 1:
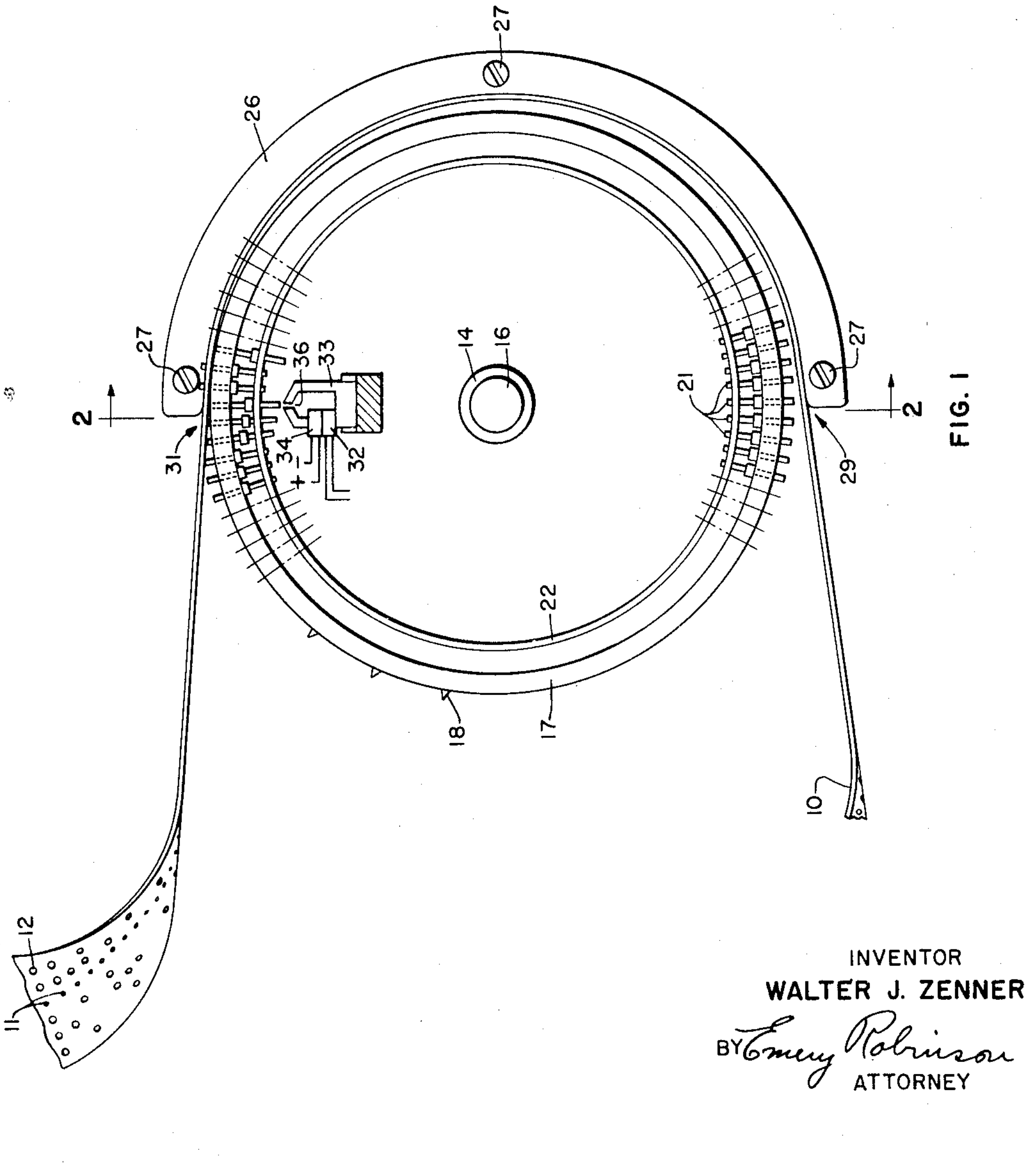

Other objects of the present invention will be apparent from the following detailed description when considered in conjunction with the accompanying drawings wherein:

Fig. 1 is a side elevational view of a tape reader embodying the principal features of the present invention; and Fig. 2 is a cross sectional view taken along line 2—2 looking in the direction indicated by the arrows.

Referring to the drawing and more particularly to Fig. 1 there is shown a telegraph message tape 10 having perforated therein longitudinally spaced feed perforations 11 and transverse permutations of coded perforations 12 indicative of intelligence signals. Each transverse row of perforations is representative of one character which is to be sensed and transmitted to a distant receiving station.

Attention is now directed to Figs. 1 and 2 wherein there is disclosed a tape reader comprising a drum 13 formed integral to a hub 14 keyed to a constantly rotating shaft 16. The shaft 16 may be rotated at ultra high speeds by any suitable driving means such as a series wound motor (not shown). The drum 13 is provided with a flange 17 having evenly spaced along its circumference a plurality of feed pins 18 which are spaced in accordance with the distance between the feed holes 11 formed in the tape 10. In transverse alignment with each feed pin are five apertures 19 having slidably mounted therein five paramagnetic sensing pins 21. Spaced from the flange 17 and secured to the wall of the drum 13 is a flat ring 22 having five apertures 23 formed therein in radial alignment with each set of five apertures 19 formed in the flange 17. The trailing end of each pin 21 is slidably fitted within one of the apertures 23 and is prevented from falling through the respective aperture by a collar 24 formed at the mid-section of each pin and interposed between the flange 17 and the flat ring 22.

A plurality of tape guide plates 26 are rigidly secured by bolts 27 to the frame 28 of the apparatus. The plate 26 are mounted in the vicinity of the periphery of the drum 13 and as illustrated in Fig. 2 are spaced from each other to receive the pins 18 and 21 therebetween. As depicted in Fig. 1, the guide plates 26 are spaced from the extremity of the pins 21 to provide a gap or entrance 29 for the reception of the tape 10. The guide plates 26 are arcuately shaped and mounted in such a fashion that the gap between the plates and the periphery of the flange gradually diminishes until in a tape exit position 31 the gap is only slightly greater than the thickness of the tape 10.

Positioned within the flange 17 and within the vicinity of the exit 24 are five "pick up" magnetic coils 32 having cores 33 in alignment with and spaced from each circumferential row of pins 17. Each core 33 is provided with an exciter coil 34 supplied with a steady constant current from a suitable source thereby providing a constant magnetomotive force to the magnetic circuit of the core 33. The core 33 is cut to provide a pair of poles with an air gap 36 therebetween at a point closest to the trailing ends of the pins 21. The five pick up coils 32 may be connected to any suitable telegraph transmitter such as the transmitter distributor shown in the copending application to T. A. Hansen, Serial No. 54,772 filed October 15, 1948, now U. S. Patent No. 2,609,451 dated September 2, 1952. In order to connect the present tape reader to the distributor shown in the Hansen application, all that is necessary is to connect the leads from the pick up coils 32 to any of the plugs 606, 607, 704, or 706, shown in Figs. 6 and 7 of the Hansen application.

In operation of the tape reader, the tape 10 is fed between the guide plates 26 and the pins 21 at the entrance gap 29, whereupon the feed pins 18 engage the tape within the feed perforations formed therein. As the tape is advanced the guide plates 26 engage the tape and progressively move the tape towards the periphery of the flange 17. While this is occurring, the drum is rotating at a speed sufficient to centrifugally urge the pins 21 to move through the apertures 19 but the pins are prevented from completely passing therethrough by the collars 24 formed on the pins 21 engaging the inner periphery of the flange 17.

As the tape 10 is progressively moved towards the flange 13 by the action of the plates 26, those pins which are in register with the perforations in the tape merely pass through the tape and between the guide plates 26 whereas those pins in register with the nonperforated portions of the tape are moved towards the axis of rotation of the drum 11. As each transverse row of permutative perforations passes the pick up coils 26, the sensing pins are permutatively positioned in accordance with the permutative perforations in the tape and consequently those pins 21 which passed through the perforations in the tape do not affect the reluctance of the air gap 34 between the pole faces of the core 33. In a situation where a pin 21 is moved against the action of the centrifugal force within an aperture 19 by the action of a nonperforated portion of the tape acting against the extremity of the pin 21, the trailing end of the pin is moved within close proximity of the air gap 24 and consequently the reluctance of the air gap is decreased. The flux density within the core 33 varies inversely with the reluctance of the air gap 36 and directly with the magnetomotive force of the exciter coil 34; therefore, as the magnetomotive force remains constant due to the constant exciter current applied to the coil 34 the decrease in reluctance of the air gap 34 by the pin 21 being positioned in close proximity thereto results in an increase in flux density within the coil to induce an impulse in the pick up coil 32. Inasmuch as the pick up coils 32 are connected to a telegraph transmitter distributor, the telegraph transmitter is energized in accordance with the permutations of coils 32 receiving impulses. It may be thus appreciated that the transmitter may be operated to transmit a signal representative of the permutations of perforations formed in the tape 10.

It is to be understood that the above described arrangements of apparatus and construction of elemental parts are simply illustrative of the application of the principles of the invention and many other modifications such as utilizing spring forces to urge the sensing pins 21 outwardly may be made without departing from the spirit and scope of the invention.

What is claimed is:

1. In a reader for tape having permutations of perforations therein, a plurality of sensing elements, means to freely support the sensing elements for centrifugal movement, means for rotating the supporting means and elements at a speed sufficient to centrifugally move the elements through the perforations, and means for progressively moving the tape toward the axis of rotation of the sensing elements whereby the sensing elements are moved by the nonperforated portions of the tape.

2. In a tape reader, a plurality of sensing elements, a carrier to freely support said elements for centrifugal movement, means for advancing a permutatively apertured tape to a sensing position, and means for rotating the carrier at sufficient speed to centrifugally move the sensing elements into engagement with the tape whereby the sensing elements are permutatively positioned in accordance with the permutations of apertures in the tape at the sensing position.

3. In a tape reader, a drum, a plurality of sensing elements freely mounted in circumferential rows on the drum, a plurality of arcuate guide plates individually mounted in alignment with the space between each row of sensing elements, and means for rotating the drum at sufficient speed to centrifugally move the sensing elements between the arcuate guide plates.

4. In a tape reader, a drum having a plurality of apertures formed therein, a sensing pin positioned within each aperture, means for radially urging the pins through apertures, means for limiting the extent of movement of the pins in the apertures, means on the drum for engaging and advancing therewith a permutatively perforated tape, and a guide positioned adjacent to the periphery of the drum for engaging and gradually moving the tape toward the drum, said movement of the tape towards the drum effectuating a gradual permutative positionment of the pins in accordance with the perforations in the tape.

5. In a tape reader, a drum, a plurality of sensing elements freely mounted in circumferential rows on the drum for centrifugal movement, an arcuate guide plate mounted in alignment with each space between said rows of sensing elements, said plates mounted to provide a decreasing gap between the periphery of the drum and the inside arcuate surface of the plates, feed means on the drum adapted to engage a permutatively apertured tape, and means for rotating the drum to advance the tape within the gap between the plates and drum, said rotation of the drum being of sufficient speed to centrifugally move those pins in alignment with apertures in the tape through the apertures and between the guide plates.

6. In a tape reader, a sensing unit having a plurality of sensing elements freely mounted therein, means for rotating the sensing unit at a speed sufficient to centrifugally move the sensing elements, means for restricting the amount of movement of the sensing elements, and means for engaging and moving a permutatively apertured tape into proximity of the sensing unit to permutatively position the sensing elements against the effect of the centrifugal force in accordance with the permutations of apertures in the tape.

7. In a tape reader, a drum having a plurality of sets of transverse apertures formed therein, a sensing pin freely positioned within each aperture for centrifugal movement, means for rotating the drum at a speed sufficient to centrifugally move the pins through apertures, means for limiting the amount of movement of the pins through the apertures, a guide positioned within close proximity of the periphery of the drum to provide a tapering guideway between the guide and the drum, means on the drum for engaging and advancing a permutatively apertured tape through guideway, said advancing tape being forced by the guideway against the centrifugally urged pins to permutatively position said pins in accordance with the permutative apertures in the tape, and means for generating impulses in accordance with the permutative positions assumed by the pins.

8. In a tape reader, a drum having a plurality of apertures formed therein arranged in circumferential rows, a pin freely mounted within each aperture for centrifugal movement, means for rotating the drum at a speed sufficient to radially move the pins through the apertures, means for limiting the movement of the pins within the apertures, a plurality of arcuate guide plates positioned to provide a tapering guideway between the plates and the periphery of the drum, said guide plates being spaced to be intermediate the circumferential rows of pins, and means on the drum for engaging and advancing a permutatively apertured tape into the guideway wherein the tape is progressively and gradually forced by the guide plates towards the drum whereby the pins are progressively and gradually passed through the apertures in the tape and between the guide plates.

9. In a tape reader, a drum, a plurality of sensing elements freely mounted in the drum, said sensing elements being arranged in transverse and circumferential rows, means for rotating the carrier at a speed sufficient to centrifugally move the elements, means for limiting the extent of movement of the elements, means for engaging and moving a tape toward the carrier and into engagement with the sensing elements, said tape having permutations of perforations therein arranged in longitudinal and transverse rows whereby the spacing of the rows of sensing elements and perforations are identical, said movement of the tape toward the carrier causing each transverse row of sensing elements to be successively and permutatively positioned in accordance with each successive transverse row of perforations, a plurality of cores, said cores having air gaps formed therein positioned in alignment with the permutatively positioned sensing elements, whereby the movement of the sensing elements by the non-perforated sections of the tape decreases the reluctance of the aligned air gaps, and means operative by the decreases in reluctance of the air gaps for generating impulses.

10. In a reader for a tape having permutations of indicia therein, a plurality of sensing elements, means to freely support the sensing elements for centrifugal movement, and means for rotating the supporting means at a speed sufficient to centrifugally move the sensing elements against the tape to read the indicia.

References Cited in the file of this patent

UNITED STATES PATENTS

| | | |
|---|---|---|
| 1,822,000 | Young | Sept. 8, 1931 |
| 2,003,329 | Young | June 4, 1935 |
| 2,025,797 | Young | Dec. 31, 1935 |